US010360158B2

(12) United States Patent
Quinnell et al.

(10) Patent No.: US 10,360,158 B2
(45) Date of Patent: Jul. 23, 2019

(54) SNOOP FILTER WITH STORED REPLACEMENT INFORMATION, METHOD FOR SAME, AND SYSTEM INCLUDING VICTIM EXCLUSIVE CACHE AND SNOOP FILTER SHARED REPLACEMENT POLICIES

(71) Applicant: Samsung Electronics Co., Ltd., Suwon-si, Gyeonggi-do (KR)

(72) Inventors: Eric C. Quinnell, Austin, TX (US); Kevin C. Heuer, Austin, TX (US); Tarun Nakra, Austin, TX (US); Akhil Arunkumar, Chandler, AZ (US)

(73) Assignee: SAMSUNG ELECTRONICS CO., LTD. (KR)

( * ) Notice: Subject to any disclaimer, the term of this patent is extended or adjusted under 35 U.S.C. 154(b) by 18 days.

(21) Appl. No.: 15/616,917

(22) Filed: Jun. 7, 2017

(65) Prior Publication Data

US 2018/0276140 A1      Sep. 27, 2018

Related U.S. Application Data

(60) Provisional application No. 62/477,412, filed on Mar. 27, 2017.

(51) Int. Cl.
  *G06F 12/123*    (2016.01)
  *G06F 12/0815*   (2016.01)
  (Continued)

(52) U.S. Cl.
  CPC ........ *G06F 12/123* (2013.01); *G06F 12/0815* (2013.01); *G06F 12/0862* (2013.01);
  (Continued)

(58) Field of Classification Search
  CPC ............... G06F 12/123; G06F 12/0815; G06F 12/0862; G06F 12/0891; G06F 2212/602; G06F 2212/621; G06F 2212/69
  See application file for complete search history.

(56) References Cited

U.S. PATENT DOCUMENTS 6,598,123 B1 *   7/2003   Anderson ............. G06F 12/082
                                                    711/133
6,857,048 B2     2/2005   Rankin et al.
(Continued)

FOREIGN PATENT DOCUMENTS

WO         2008092159 A1     7/2008

*Primary Examiner* — Larry T Mackall
(74) *Attorney, Agent, or Firm* — Renaissance IP Law Group LLP

(57) ABSTRACT

Embodiments of the present system and method provide cache replacement in a victim exclusive cache using a snoop filter where replacement information is not lost during a re-reference back to the CPU. Replacement information is stored in a snoop filter, meaning that historical access data may be fully preserved and allows for more flexibility in the LLC re-insertion points, without additional bits stored in a L2 cache. The present system and method further include snoop filter replacement technique. The present system and method passes replacement information between a snoop filter and a victim exclusive cache (e.g., LLC) when transactions move cachelines to and from a master CPU. This maintains and advances existing replacement information for a cacheline that is removed from the victim exclusive cache on a read, as well as intelligently replaces and ages cachelines in the snoop filter.

6 Claims, 11 Drawing Sheets

(51) Int. Cl.
*G06F 12/0891* (2016.01)
*G06F 12/0862* (2016.01)

(52) U.S. Cl.
CPC .... *G06F 12/0891* (2013.01); *G06F 2212/602* (2013.01); *G06F 2212/621* (2013.01)

(56) References Cited

U.S. PATENT DOCUMENTS

| | | | |
|---|---|---|---|
| 7,325,102 | B1 | 1/2008 | Cypher |
| 8,935,485 | B2 | 1/2015 | Jalal et al. |
| 9,058,269 | B2 | 6/2015 | Krick et al. |
| 9,367,477 | B2 | 6/2016 | Topp et al. |
| 9,405,706 | B2 | 8/2016 | Doshi et al. |
| 9,495,312 | B2 | 11/2016 | Ganfield et al. |
| 9,507,716 | B2 | 11/2016 | Salisbury et al. |
| 2002/0099913 | A1* | 7/2002 | Steely, Jr. ........... G06F 12/0897 711/122 |
| 2003/0070016 | A1 | 4/2003 | Jones et al. |
| 2006/0294314 | A1* | 12/2006 | Cheng ................... G06F 12/082 711/136 |
| 2010/0268895 | A1* | 10/2010 | Ghai ................... G06F 12/0855 711/141 |
| 2013/0042078 | A1* | 2/2013 | Jalal ................... G06F 12/0815 711/146 |
| 2014/0095806 | A1 | 4/2014 | Fajardo et al. |
| 2015/0186275 | A1* | 7/2015 | Moga ................... G06F 12/0811 711/122 |
| 2016/0085677 | A1* | 3/2016 | Loh ................... G06F 12/0815 711/143 |
| 2016/0092366 | A1 | 3/2016 | Pal et al. |

\* cited by examiner

SNOOP FILTER WITH STORED REPLACEMENT INFORMATION, METHOD FOR SAME, AND SYSTEM INCLUDING VICTIM EXCLUSIVE CACHE AND SNOOP FILTER SHARED REPLACEMENT POLICIES

RELATED APPLICATION DATA

This application claims the benefit of U.S. Provisional Patent Application Ser. No. 62/477,412, filed on Mar. 27, 2017, which is hereby incorporated by reference.

FIELD

The present disclosure relates to digital caches, and more particularly, to a snoop filter with stored replacement information and associated method and system including victim exclusive cache and snoop filter shared replacement policies.

BACKGROUND

A last level cache (LLC) in a central processing unit (CPU) is generally sized to hold a few megabytes (MB) of data or instruction lines of recent memory accesses to lower the latency of requests from the CPUs themselves as compared to dynamic random access memory (DRAM). While such a cache is large relative to a level 1 (L1) cache or a level 2 (L2) cache inside the CPU, an LLC—especially if shared among multiple CPUs—receives/sends all memory traffic from multiple threads which can fill up the cache rather quickly. A cache replacement policy or method is typically applied when the cache fills to capacity and needs to select which data to victimize and which data to keep for maximum performance.

An LLC or a shared cache may be either inclusive or exclusive. An exclusive shared cache is sometimes referred to as a victim cache. An inclusive cache is a cache where each data or instruction line held by a master CPU is redundantly copied within the cache itself. Tracking a redundant copy of a cacheline as well as tag state allows for an implicit, zero-cost snoop filter where any outside memory requests or snoops and/or probes may be filtered and serviced by the LLC itself, reducing memory traffic to the master CPU. A cacheline is a grouping of data associated with a cache entry.

In contrast to an inclusive cache, a victim exclusive cache is a cache where data storage only occurs after a master CPU victimizes (i.e., ejects) a cacheline. A victim exclusive cache does not hold data lines of its master CPU. This provides more efficient unique local cache storage by not polluting LLC entries with redundant data, at the expense of increased memory snoops and/or probes and greater coherence flow complexity. A victim exclusive cache typically adds a dedicated snoop filter to track a coherency state of cachelines that exist in the master CPU but not in the cache to regain the reduction in memory traffic to the master CPU. A snoop filter is LLC storage that tracks the meta-state of cachelines, but not their data payload. This helps reduce the traffic problem of a victim LLC or a fabric with no local cache.

Typically, cache replacement policies apply to an inclusive cache, and rarely for a victim exclusive cache. A victim exclusive cache has a definition of de-allocating a cacheline when it is re-referenced by a master CPU, which is not beneficial for a cache replacement policy attempting to track history.

SUMMARY

Embodiments include a shared replacement policy computer cache system. The system may include a master processor, a victim exclusive last level cache (LLC) communicatively coupled to the master processor, and a snoop filter communicatively coupled to the victim exclusive LLC and to the master processor. The snoop filter is configured to store replacement information. The system may include a replacement state machine configured to manage replacement operations between the victim exclusive LLC and the snoop filter with the stored replacement information.

Embodiments of the present system and method provide cache replacement in a victim exclusive cache using a snoop filter where replacement information is not lost during a re-reference back to the CPU. Replacement information is stored in a snoop filter, meaning that historical access data may be fully preserved. The present system and method further include snoop filter replacement technique. The present system and method passes replacement information between a snoop filter and a victim exclusive cache (e.g., LLC) when transactions move cachelines to and from a master CPU. This maintains and advances existing replacement information for a cacheline that is removed from the victim exclusive cache on a read, as well as intelligently replaces and ages cachelines in the snoop filter.

BRIEF DESCRIPTION OF THE DRAWINGS

The foregoing and additional features and advantages of the present inventive principles will become more readily apparent from the following detailed description, made with reference to the accompanying figures, in which.

DETAILED DESCRIPTION

Figure 1A:
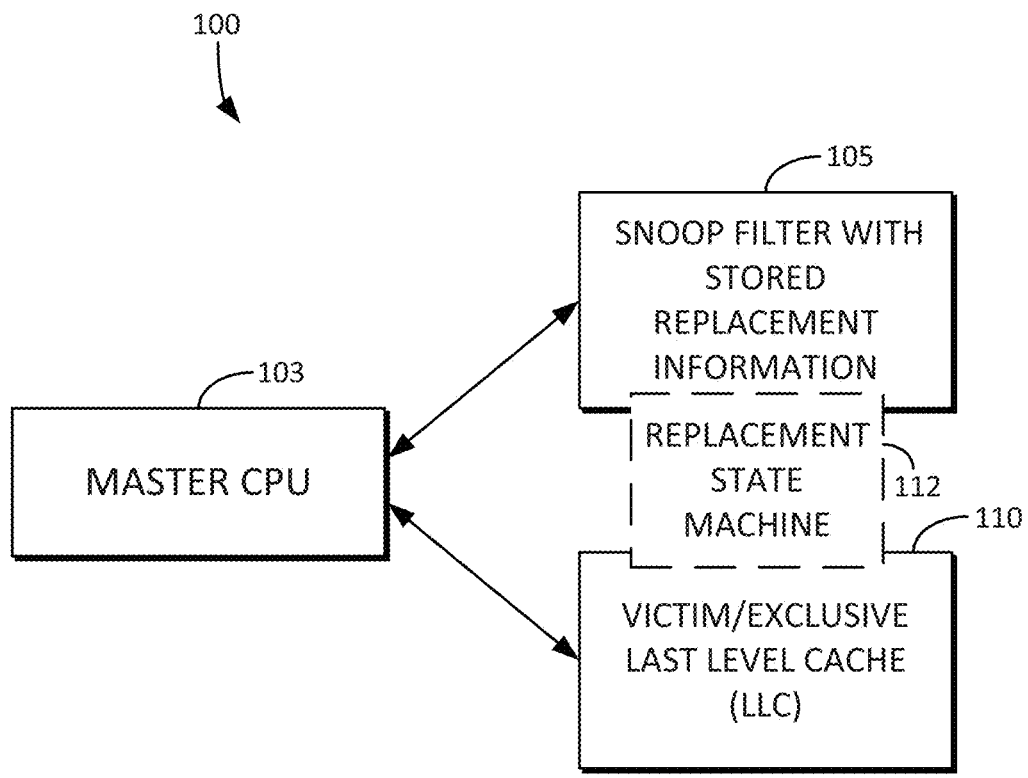
FIG. 1A is an example block diagram of a master CPU, a snoop filter with stored replacement information, and an associated victim exclusive last level cache (LLC) in accordance with some embodiments.

Reference will now be made in detail to various embodiments, examples of which are illustrated in the accompanying drawings. In the following detailed description, numerous specific details are set forth to enable a thorough understanding of the embodiments. It should be understood, however, that persons having ordinary skill in the art may practice the embodiments without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first cache could be termed a second cache, and, similarly, a second cache could be termed a first cache, without departing from the scope of the embodiments.

The terminology used in the description of the embodiments herein is for the purpose of describing particular embodiments only and is not intended to be limiting of the embodiments. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Embodiments of the present system and method provide cache replacement in a victim exclusive cache using a snoop filter where replacement information is not lost during a re-reference back to the CPU. This may exist in several forms, including hit priority, frequency priority, and/or support for pseudo-inclusive or weak-exclusive. Replacement information is stored in a snoop filter, meaning that historical access data may be fully preserved and allows for more flexibility in the LLC re-insertion points, without additional bits stored in a L2 cache. The present system and method further include snoop filter replacement technique. The present system and method passes replacement information between a snoop filter and a victim exclusive cache (e.g., LLC) when transactions move cachelines to and from a master CPU. This maintains and advances existing replacement information for a cacheline that is removed from the victim exclusive cache on a read, as well as intelligently replaces and ages cachelines in the snoop filter.

Figure 1B:
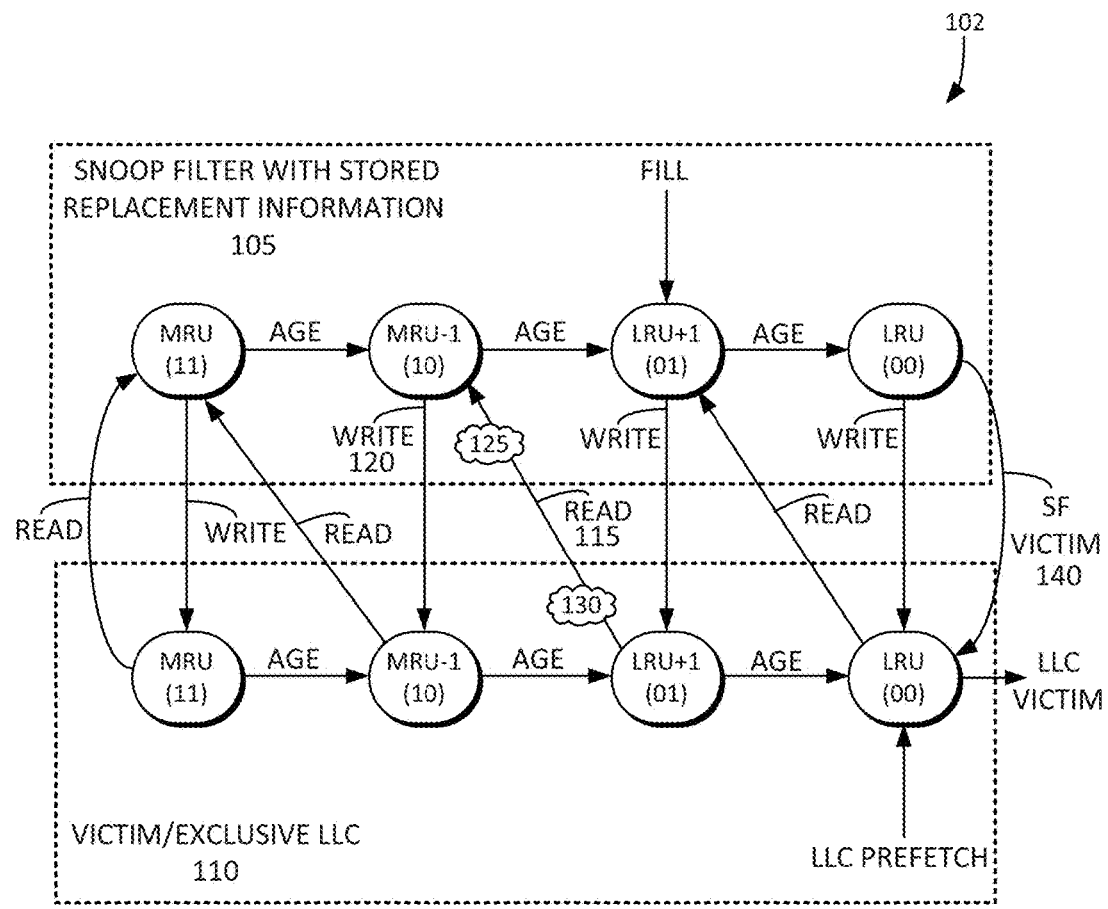
FIG. 1B is an example state diagram of a snoop filter with stored replacement information and associated victim exclusive LLC in accordance with some embodiments.

FIG. 1A is an example block diagram of a system 100 including a master CPU 103, a snoop filter with stored replacement information 105, an associated victim exclusive last level cache (LLC) 110, and a replacement state machine 112 in accordance with some embodiments. FIG. 1B is an example state diagram 102 of a snoop filter with stored replacement information 105 and associated victim exclusive LLC 110 in accordance with some embodiments. Reference is now made to FIGS. 1A and 1B.

A cache replacement policy may be implemented using the snoop filter with stored replacement information 105 and associated victim exclusive LLC 110. FIG. 1B illustrates a particular cache replacement policy that may be referred to as a frequency priority form of the replacement state machine 112, where any read hits in the LLC increase the replacement tracking value by 1.

For example, a read operation to an LLC tracking least recently used (LRU)+1 promotes to most recently used (MRU)−1 replacement state as shown by line 115. By definition, a read from a victim exclusive cache such as the LLC 110 removes the cacheline from the cache itself and passes it up to the requesting master CPU 103. In this scheme, tag 125 and/or replacement information 130 are passed to the snoop filter 105 instead of passing the cacheline data itself. The tag 125 may include metadata of the cacheline, such as an address, a modified-owned-exclusive-shared-invalid (MOESI), and so forth. The replacement information 130 may include metadata of stored state and replacement order, such as an LRU state. Also, a write from the master CPU 103 tracked by the snoop filter 105 allocates into the LLC 110. According to one embodiment, the snoop filter 105 stores the tag 125 and/or the replacement information 130 as data written to the LLC storage mechanism (e.g., the LLC 110).

Figure 2:
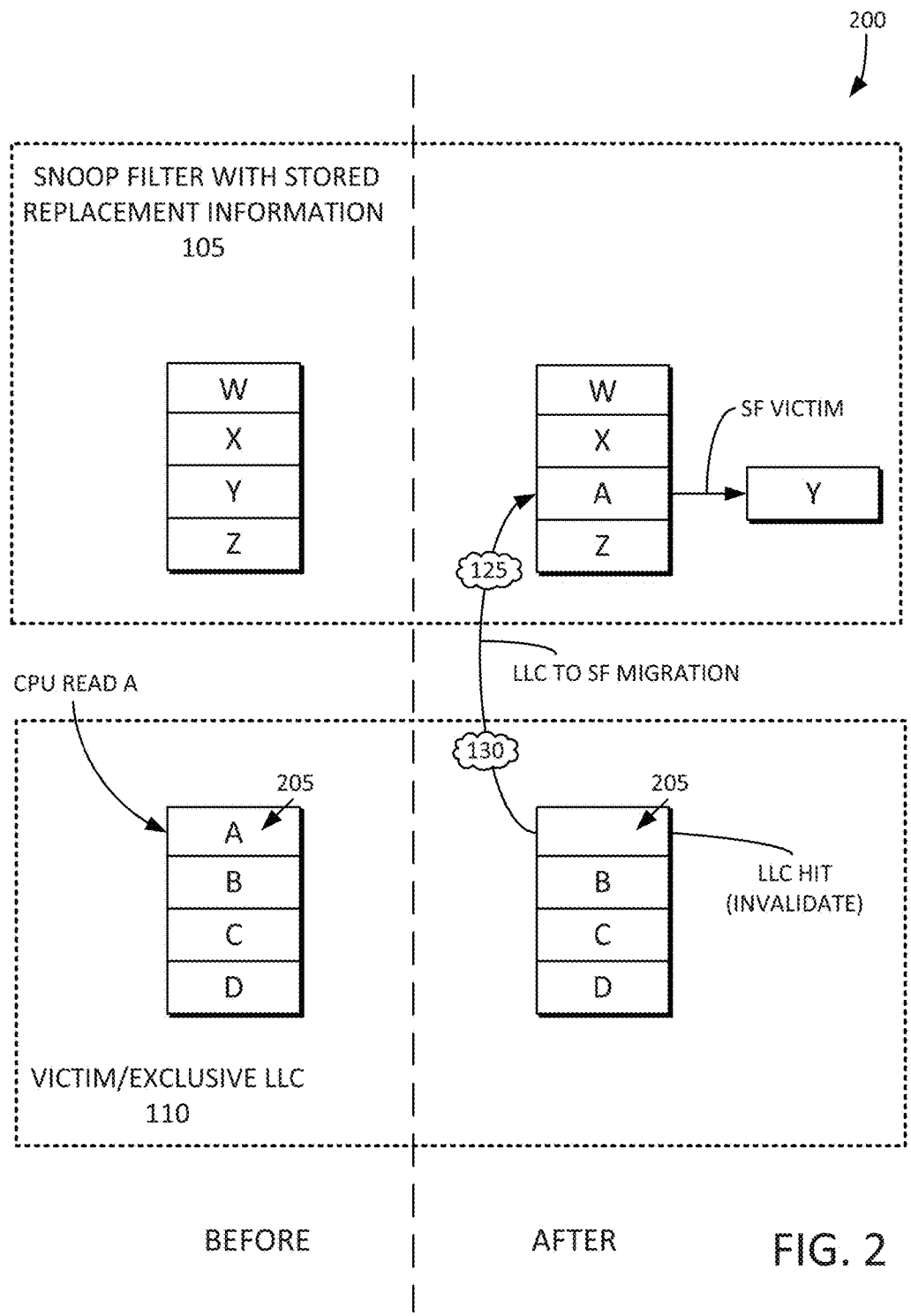
FIG. 2 is an example block and flow diagram of the snoop filter with stored replacement information and associated victim exclusive LLC for managing a CPU read in accordance with some embodiments.

FIG. 2 is an example block and flow diagram 200 of the snoop filter with stored replacement information 105 and the associated victim exclusive LLC 110 for managing a CPU read in accordance with some embodiments. Reference is now made to FIGS. 1A, 1B, and 2.

According to one embodiment, the present replacement state machine 112 is relevant when either storage of the snoop filter 105 or storage of the LLC 110 is full. Unlike an inclusive cache, both a victim exclusive cache (e.g., 110) and a dedicated snoop filter (e.g., 105) invalidate their entry when a read or write moves a cacheline between the victim exclusive cache (e.g., 110) and the snoop filter (e.g., 105).

In this case, the request to cacheline 'A' is stored in the LLC 110. The LLC 110 resolves in a cache hit and subsequently reads out data to the requesting master CPU 103, leaving the LLC entry 205, where cacheline 'A' once was, as invalid according to the definition of an exclusive/victim cache. The meta information including the tag 125 and/or the replacement information 130 is passed to the dedicated snoop filter 105, so as to both filter future snoops/probes to the cacheline as well as retain current replacement priority information about the cacheline.

If the snoop filter 105 is not at full capacity, the migrating cacheline 'A' enters into an invalid space (not shown) in the snoop filter 105 and the transaction is completed. However, if the snoop filter 105 is full of tracked cacheline information, the snoop filter 105 has to make a replacement decision.

According to one embodiment, the snoop filter 105 uses the replacement state machine 112 to determine a victim selection (e.g., entry 'Y'), victimize the entry out of the snoop filter 105, and replaces the entry with the new information for the delivered read 'A.' As the victim is from a snoop filter 105 and not an LLC cache 110, the system logic snoops/probes the victimized tracking cacheline 'Y' from the master CPU 103 and allocates the information into the LLC 110, as shown at 140 in FIG. 1B.

Figure 3:
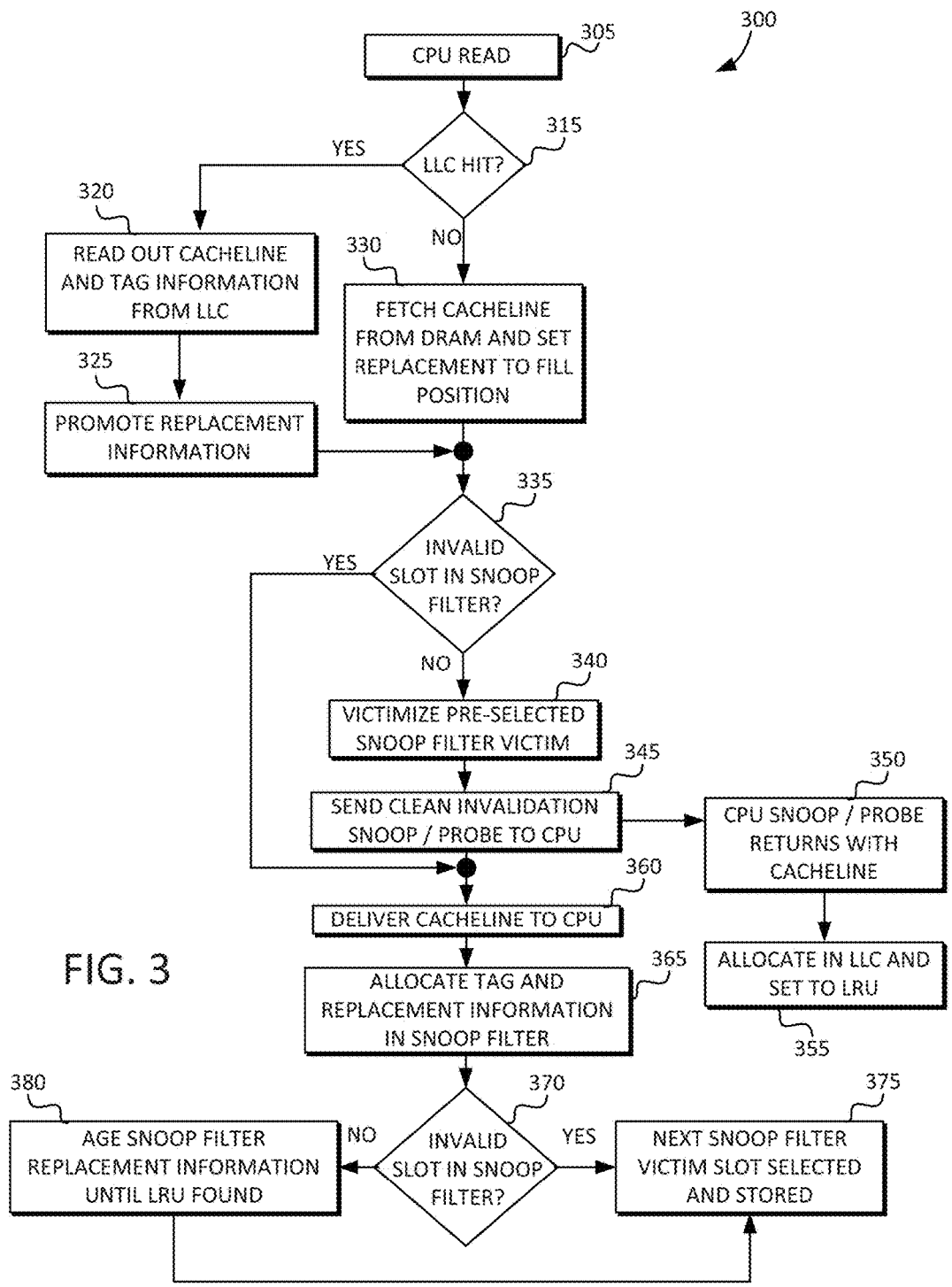
FIG. 3 is an example flow diagram showing a technique for managing the snoop filter with stored replacement information and associated victim exclusive LLC for a CPU read in accordance with some embodiments.

FIG. 3 is an example flow diagram 300 showing a technique for managing the snoop filter with stored replacement information 105 and the associated victim exclusive LLC 110 for a CPU read in accordance with some embodiments.

At 305, a CPU read is initiated. At 315, the present system determines whether there is a cache hit in the LLC 110. If there is a cache hit in the LLC 110, a cacheline and the tag information 125 is read out from the LLC 110 at 320. At 325, the replacement information 130 may be promoted, or otherwise transferred to and stored by the snoop filter 105. If there is no LLC cache hit at 315, a cacheline is fetched from DRAM and a corresponding snoop filter entry allocated with the replacement information (e.g., LRU+1) for such fills from DRAM at 330.

At 335, the present system determines whether a slot in the snoop filter 105 is invalid. If there is no invalid slot (e.g., no invalid entry) at 335, a preselected entry in the snoop filter 105 is victimized at 340. At 345, the present system sends a clean invalidation snoop/probe to the master CPU 103. At 350, a CPU snoop/probe is returned with the cacheline. At 355, the present system allocates an entry in the LLC 110 and set the entry to least recently used (LRU).

If there is an invalid slot in the snoop filter at 335, the present system delivers the cacheline to the master CPU 103 at 360. At 365, the present system allocates the tag 125 and/or the replacement information 130 in the snoop filter 105. At 370, the present system determines whether a slot in the snoop filter 105 is invalid. If the slot in the snoop filter 105 is invalid at 370, the present system selects and stores the next snoop filter victim slot at 375. If no invalid slot exists in the snoop filter 105 at 370, the present system ages the snoop filter replacement information 130 until the LRU is found at 380.

Figure 4:
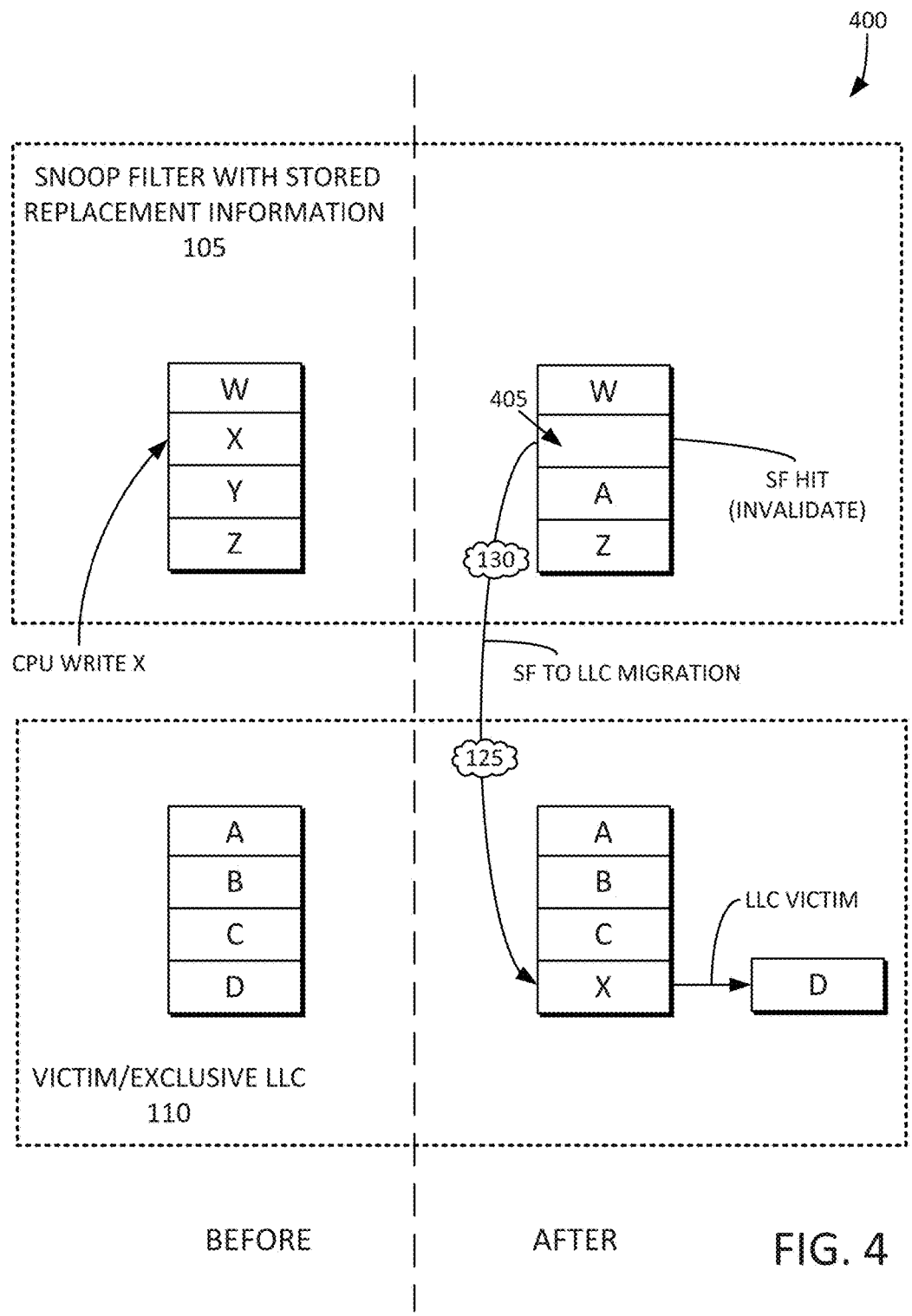
FIG. 4 is an example block and flow diagram of the snoop filter with stored replacement information and associated victim exclusive LLC for managing a CPU write in accordance with some embodiments.

FIG. 4 is an example block and flow diagram 400 of the snoop filter with stored replacement information 105 and associated victim exclusive LLC 110 for managing a CPU write in accordance with some embodiments.

A full data write-back to cacheline 'X' may come from a tracked CPU 103. Control logic within the snoop filter 105 may determine the cacheline information and subsequently read out the meta information including the tag 125 and the replacement information 130 to be passed to the LLC 110, leaving the entry 405 in the snoop filter 105 as invalid. In other words, snoop filter 105 may pass the tag 125 and the replacement information 130 to the LLC 110. Similar to the CPU read request described above with reference to FIG. 2, if the LLC 110 has an invalid entry available (not shown), the CPU write transaction allocates the data, the tag 125, and the replacement information 130 into the available slot. However, if the LLC 110 is at full capacity, as shown in FIG. 4, then the LLC 110 needs to select and read out a victim (e.g., transaction 'D') before allocating the new cacheline 'X.'

Figure 5:
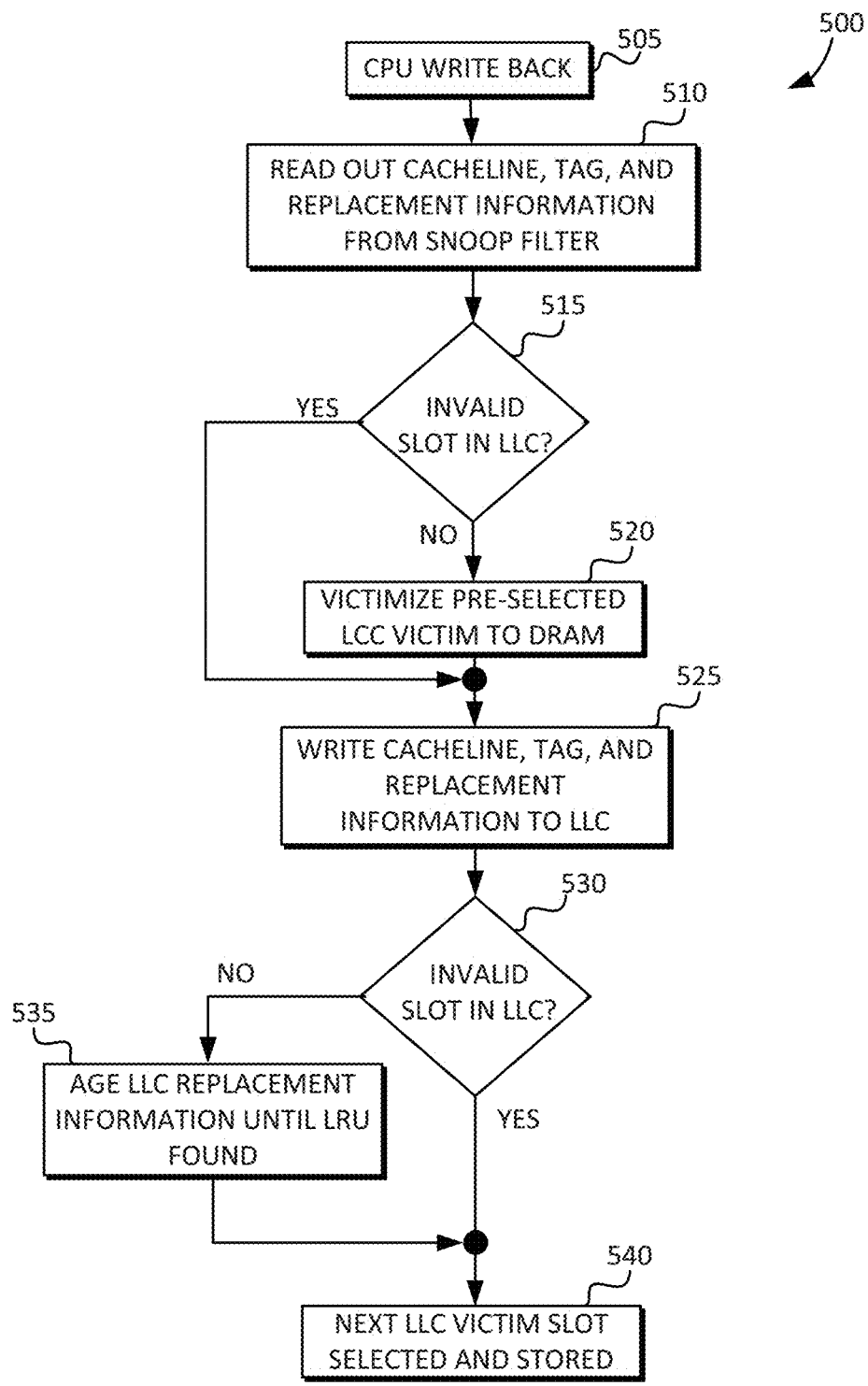
FIG. 5 is a flow diagram showing a technique for managing the snoop filter with stored replacement information and associated victim exclusive LLC for a CPU write back in accordance with some embodiments.

FIG. 5 is a flow diagram 500 showing a technique for managing the snoop filter with stored replacement information 110 and the associated victim exclusive LLC 110 for a CPU write back in accordance with some embodiments.

At 505, a CPU write back is initiated. At 510, the present system reads out a cacheline (e.g., 'A'), a tag (e.g., 125), and replacement information (e.g., 130) from the snoop filter 105. At 515, the present system determines whether there is an invalid slot in the LLC 110. If there is no invalid slot in the LLC 110 at 515, the present system victimizes a pre-selected LLC victim to DRAM at 520. If there is an invalid slot in the LLC 110 at 515, the present system 525 to write the cacheline, the tag, and the replacement information to the LLC 110 at 525.

At 530, the present system determines whether a slot (e.g., entry) is invalid in the LLC 110. If the slot is not invalid in the LLC 110 at 530, the present system ages LLC replacement information until an LRU is found at 535. If the slot is invalid in the LLC 110 at 530, the present system selects and stores the next LLC victim slot at 540. The insertion points, values, and promotion vectors to the above frequency priority replacement state machine may be adjusted without departing from the inventive scope of the present system.

Figure 6:
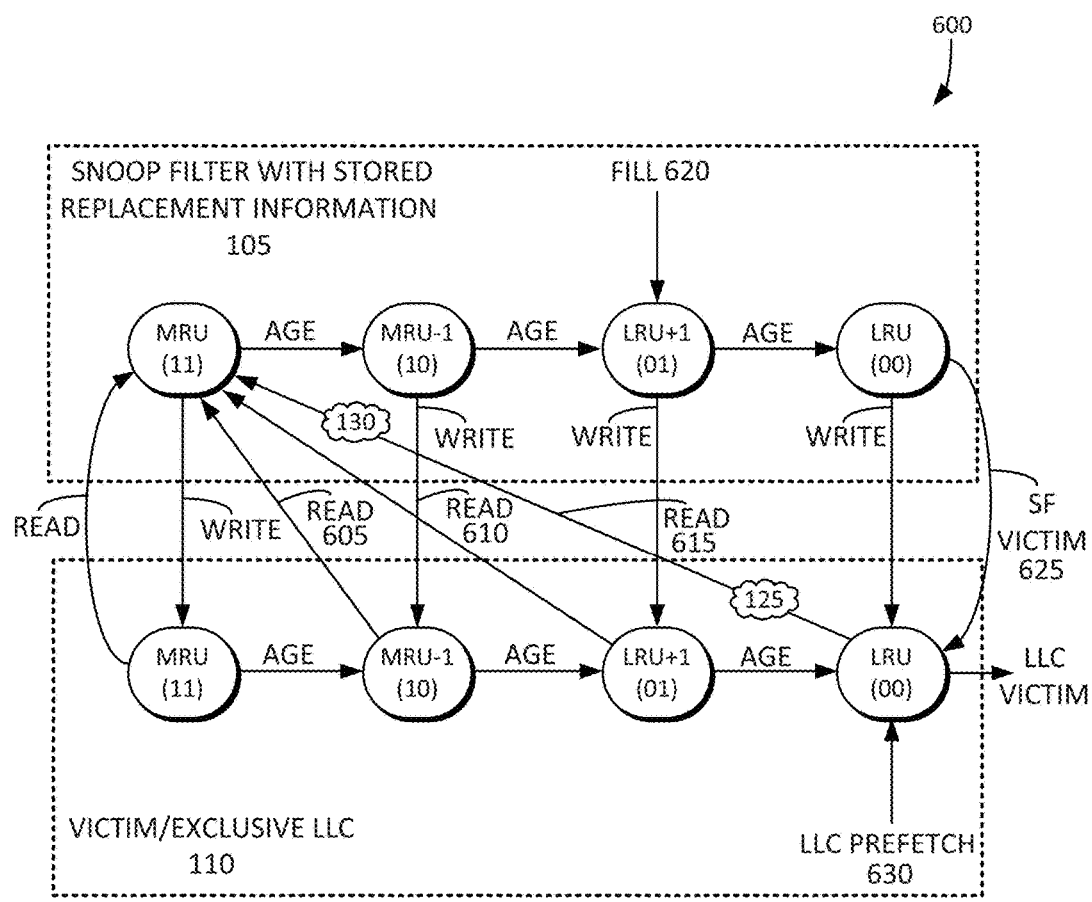
FIG. 6 is another example state diagram of a snoop filter with stored replacement information and associated victim exclusive LLC in accordance with some embodiments.

FIG. 6 is another example state diagram 600 of the snoop filter with stored replacement information 105 and associated victim exclusive LLC 110 in accordance with some embodiments.

In some embodiments, an LLC using hit priority replacement promotes any reads from the LLC 110 directly to an MRU entry in the snoop filter 105, as shown by lines 605, 610, and 615. In some embodiments, the tag 125 and/or the replacement information 130 is promoted from the LLC 110 to the snoop filter 105 as discussed in detail above, but in this case, to the MRU in the snoop filter 105. Adjustments for insertion values for fill 620, snoop filter victims 625, prefetches 630, and even instruction versus data cache may be moved or implemented according to need.

Figure 7:
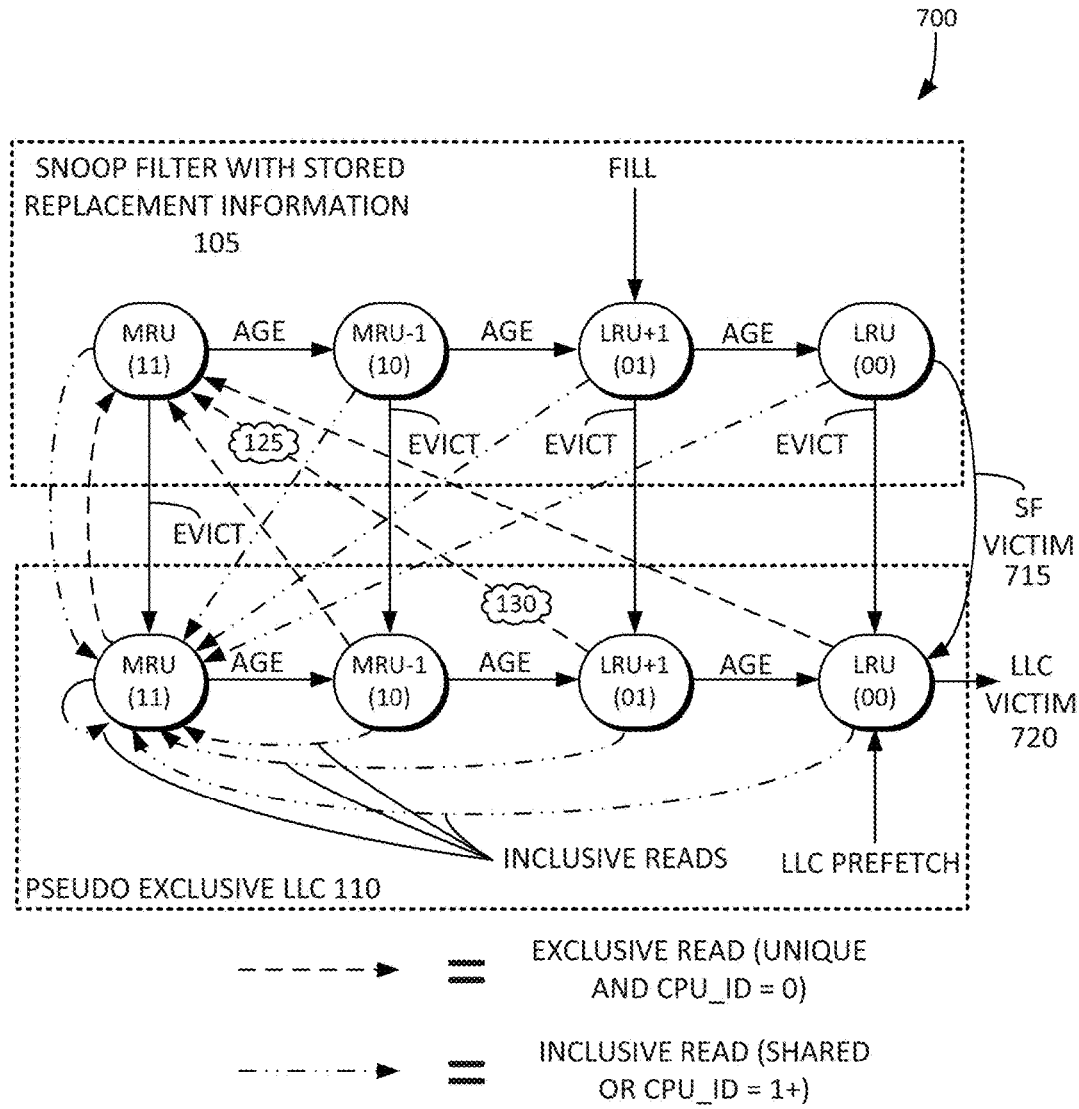
FIG. 7 is yet another example state diagram of a snoop filter with stored replacement information and associated victim exclusive LLC in accordance with some embodiments.

FIG. 7 is yet another example state diagram 700 of a snoop filter with stored replacement information 105 and associated victim exclusive LLC 110 in accordance with some embodiments.

The nature of cachelines and state tracking in the victim exclusive LLC 110 may result in a more complex state machine as illustrated in FIG. 7. According to one embodiment, selectively inclusive cachelines living in a the victim exclusive LLC 110 are used, allowing for advantages for lines that are shared among multiple CPUs or master CPUs (e.g., 103)—a technique that is better performing for certain situations and advantageous in CPU writes that do not also invalidate the cacheline from the master CPU 103. A system using such amended definitions may adjust the replacement state machine 112 to increment on hit or frequency priorities.

According to one embodiment, the present system and method provides a cache replacement policy for the victim exclusive LLC 110 that retains full re-reference history by passing information to and from the snoop filter 105, which tracks cachelines not resident in the victim exclusive LLC 110. Variants on the cache replacement policy may prioritize promotion based on hit or frequency metrics. Variants on the cache replacement policy allow for a pseudo-inclusive or a weak-exclusive cache support by promotion within the victim exclusive LLC 110 or the snoop filter 105.

According to one embodiment, the present system and method provides cache replacement in the victim exclusive LLC 110 using the snoop filter with stored replacement information 105. For a CPU read request where a request to a cacheline is stored in the exclusive/victim LLC 110, the present system may victimize an entry out of the snoop filter 105 as shown at 715 when the snoop filter 105 is at full capacity. Moreover, the present system may allocate the tag 125 and the replacement information 130 for the cacheline into the snoop filter 105, and deliver the cacheline to the CPU 103. For a CPU write request where data write to a cacheline is coming from the CPU 103, the present system may (i) read from the snoop filter 105, the tag 125 and the replacement information 130 of the cacheline; (ii) move, from the snoop filter 105, the tag 125 and the replacement information 130 to the exclusive/victim LLC 110; and (iii) read out, by the exclusive/victim LLC 110, a victim from the exclusive/victim LLC 110 as shown at 720 before allocating the cacheline, if the exclusive/victim LLC 110 is at full capacity.

The dashed lined arrows shown in FIG. 7 represent exclusive reads (i.e., unique and when CPU_ID=0). The dashed/dotted lined arrows shown in FIG. 7 represent inclusive reads (i.e., shared or when CPU_ID=1 or greater than 1, in a multi-CPU system). In other words, reads from the snoop filter 105 to an MRU entry in the pseudo exclusive LLC 110 may be inclusive to a plurality of processors. If a cacheline is inclusive in the LLC 110, then it may be evicted from the master CPU 103—and in this case, a write to the LLC 110 is not needed because inclusive in the LLC means the cacheline data is already in the LLC 110.

Figure 8:
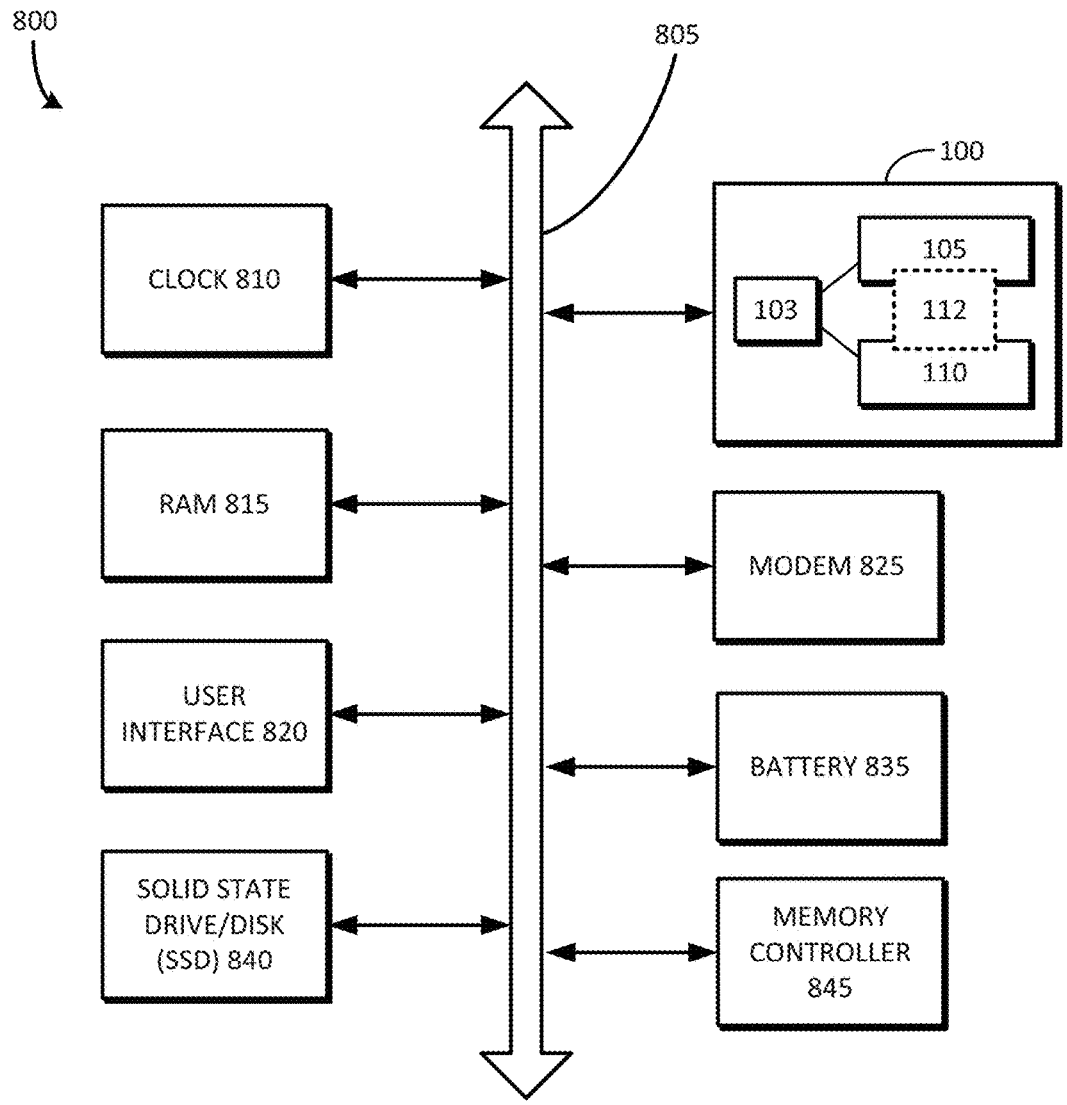
FIG. 8 is an example block diagram of a computer system including the snoop filter with stored replacement information and associated victim exclusive LLC in accordance with some embodiments.

FIG. 8 is an example block diagram of a computer system 800 including the snoop filter with stored replacement information 105, the associated victim exclusive LLC 110, the master CPU 103, and the replacement state machine 112 of system 100 in accordance with some embodiments.

Referring to FIG. 8, the computing system 800 may also include a clock 810, a random access memory (RAM) 815, a user interface 820, a modem 825 such as a baseband chipset, a solid state drive/disk (SSD) 840, a memory controller 845, and/or a battery 835, any or all of which may be electrically coupled to a system bus 805. The system 100 including the snoop filter with stored replacement information 105 and the associated victim exclusive LLC 110 may correspond to those embodiments described in detail above, and may also be electrically coupled to the system bus 805.

If the computing system 800 is a mobile device, the battery 835 may power the computing system 800. Although not shown in FIG. 8, the computing system 800 may further include an application chipset, a camera image processor (CIS), a mobile DRAM, and the like.

In example embodiments, the computing system 800 may be used as a computer, computer server, server rack, portable computer, Ultra Mobile PC (UMPC), workstation, net-book, PDA, web tablet, wireless phone, mobile phone, smart phone, e-book, PMP (portable multimedia player), digital camera, digital audio recorder/player, digital picture/video recorder/player, portable game machine, navigation system, black box, 3-dimensional television, a device capable of transmitting and receiving information at a wireless circumstance, one of various electronic devices constituting home network, one of various electronic devices constituting computer network, one of various electronic devices constituting a telematics network, RFID, or one of various electronic devices constituting a computing system.

Figure 9:
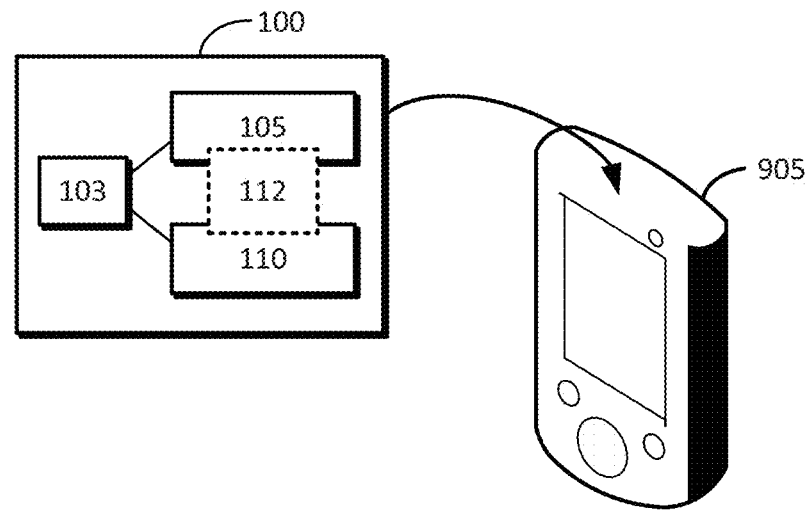
FIG. 9 is an example smart phone including the snoop filter with stored replacement information and associated victim exclusive LLC in accordance with some embodiments.

FIG. 9 is an example smart phone 905 including the system 100 in accordance with some embodiments.

Figure 10:
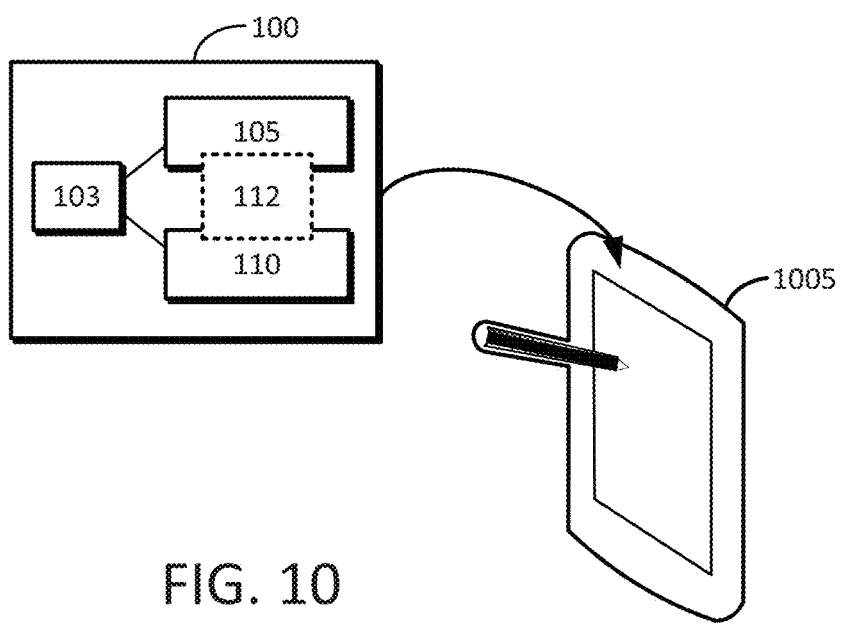
FIG. 10 is an example smart tablet including the snoop filter with stored replacement information and associated victim exclusive LLC in accordance with some embodiments.

FIG. 10 is an example smart tablet 1005 including the system 100 in accordance with some embodiments.

Figure 11:
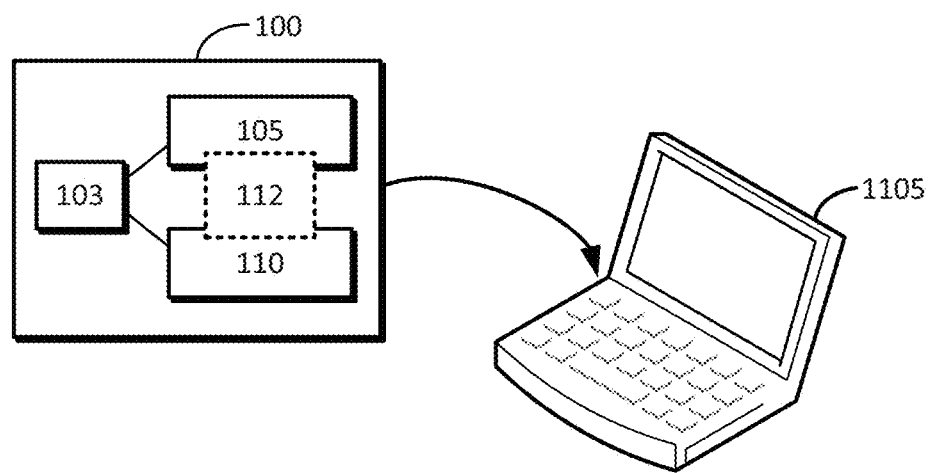
FIG. 11 is an example notebook computer including the snoop filter with stored replacement information and associated victim exclusive LLC in accordance with some embodiments.

FIG. 11 is an example notebook computer 1105 including the system 100 in accordance with some embodiments.

Figure 12:
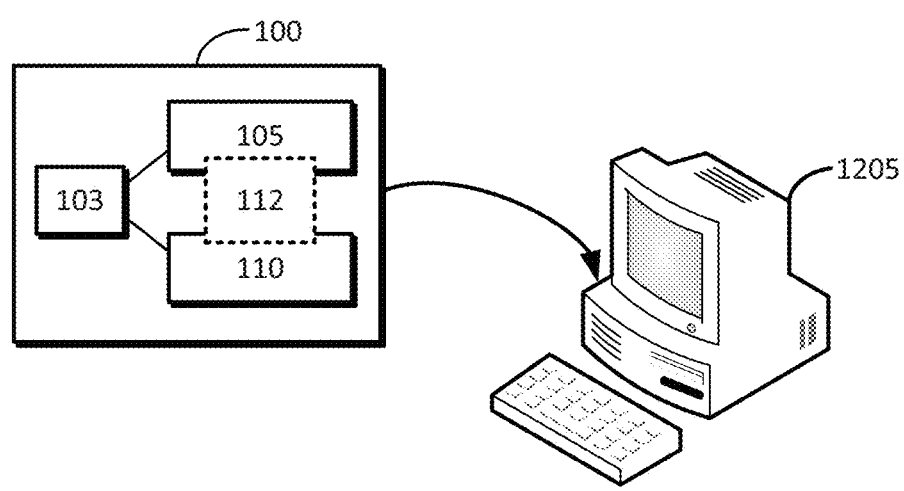
FIG. 12 is an example desktop computer including the snoop filter with stored replacement information and associated victim exclusive LLC in accordance with some embodiments.

FIG. 12 is an example desktop computer 1205 including the system 100 in accordance with some embodiments.

Embodiments are described herein, and illustrated in the drawings, in terms of functional blocks, units and/or modules. Those skilled in the art will appreciate that these blocks, units and/or modules can be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

The following discussion is intended to provide a brief, general description of a suitable machine or machines in which certain aspects of the inventive concept can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the inventive concept with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the invention may include a non-transitory machine-readable medium comprising instructions executable by one or more processors, the instructions comprising instructions to perform the elements of the embodiments as described herein.

Consequently, in view of the wide variety of permutations to the embodiments described herein, this detailed description and accompanying material is intended to be illustrative only, and should not be taken as limiting the scope of the embodiments. What is claimed as the invention, therefore, is all such modifications as may come within the scope and spirit of the following claims and equivalents thereto.

What is claimed is:

1. A shared replacement policy computer cache system, comprising:
    a master processor;
    a victim exclusive last level cache (LLC) communicatively coupled to the master processor;
    a snoop filter communicatively coupled to the victim exclusive LLC and to the master processor, wherein the snoop filter is configured to store replacement information, wherein the replacement information includes metadata of stored state and replacement order;
    a replacement state machine configured to manage replacement operations between the victim exclusive LLC and the snoop filter with the stored replacement information,
    wherein in response to a read operation from the master processor, the victim exclusive LLC is configured to pass the replacement information to the snoop filter, to remove a cacheline, and to pass the cacheline to the master processor;
    wherein in response to the read operation from the master processor, the victim exclusive LLC is configured to pass a tag to the snoop filter, wherein the snoop filter is configured to receive the replacement information and the tag instead of the cacheline itself;
    wherein in response to a write operation from the master processor, the snoop filter is configured to pass the tag and the replacement information to the victim exclusive LLC;
    wherein the replacement state machine is configured to select an entry in the victim exclusive LLC to victimize, to cause the selected entry to be victimized out of the victim exclusive LLC, to cause the victim exclusive LLC to store the replacement information and the tag in the entry in the victim exclusive LLC, and to allocate a new cacheline in the entry in the victim exclusive LLC;
    wherein the victim exclusive LLC is a pseudo exclusive LLC; and
    wherein reads from the snoop filter to an MRU entry in the pseudo exclusive LLC are inclusive to a plurality of processors including the master processor.

2. The shared replacement policy computer cache system of claim 1, wherein the replacement state machine is configured to manage the replacement operations dependent on the replacement information stored in the snoop filter.

3. The shared replacement policy computer cache system of claim 1, wherein the replacement state machine is configured to select an entry in the snoop filter to victimize, to cause the selected entry to be victimized out of the snoop filter, and to cause the snoop filter to store the replacement information and the tag in the entry.

4. The shared replacement policy computer cache system of claim 3, wherein:
    the selected entry includes a tracking cacheline;
    the replacement state machine is configured to victimize the tracking cacheline;
    the master processor is configured to probe the victimized cacheline; and
    the replacement state machine is configured to cause the tracking cacheline to be allocated into the victim exclusive LLC.

5. The shared replacement policy computer cache system of claim 1, wherein the replacement state machine is configured to promote any reads from the victim exclusive LLC to a most recently used (MRU) entry in the snoop filter.

6. The shared replacement policy computer cache system of claim 1, wherein the reads from the victim exclusive LLC to the MRU entry in the snoop filter are exclusive to the master processor.

* * * * *